Sept. 15, 1959   F. FAHNOE   2,904,418
METHOD OF MAKING A GRINDING TOOL
Filed Feb. 25, 1955
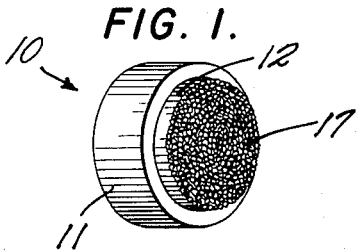
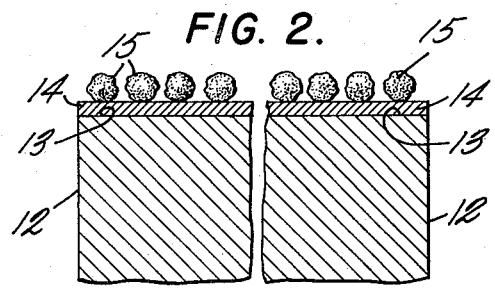
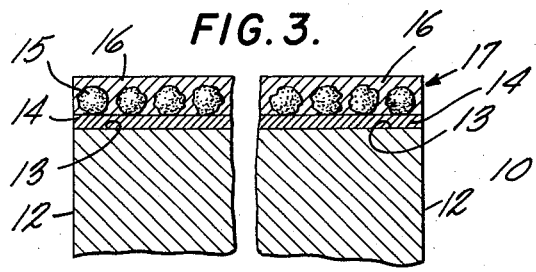
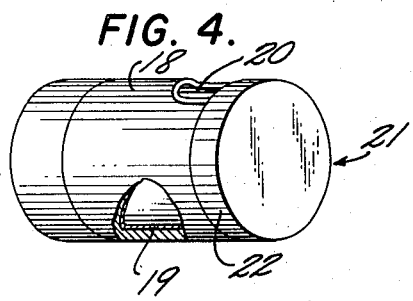
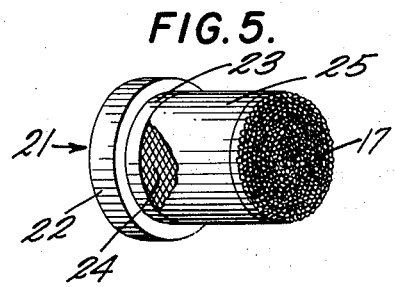
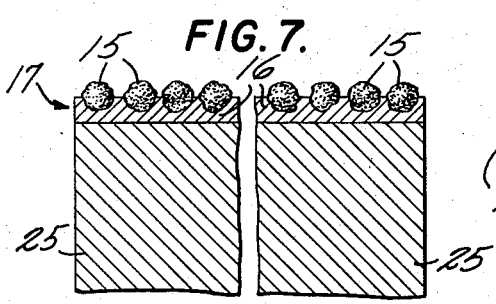
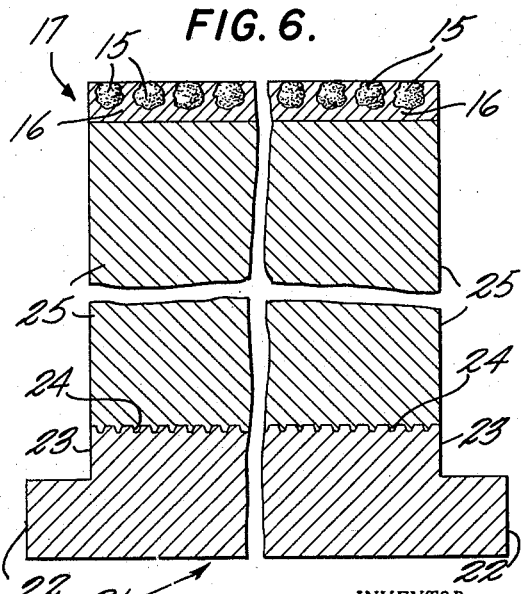
INVENTOR.
FREDERICK FAHNOE
BY Campbell, Brumbaugh, Free + Graves
  his   ATTORNEYS.

United States Patent Office 2,904,418
Patented Sept. 15, 1959

2,904,418
METHOD OF MAKING A GRINDING TOOL
Frederick Fahnoe, Morristown, N.J., assignor to Vibro Corporation of America, Verona, N.J.
Application February 25, 1955, Serial No. 490,629
9 Claims. (Cl. 51—293)

This invention relates to a grinding tool and methods for producing such tool and embodies, more specifically, the production of a grinding tool provided with an extremely flat abrasive surface.

It is often necessary to shape various articles with great accuracy by means of high speed grinders such, for example, as in the lapping of quartz glass, cemented carbides, and ceramics such as steatite. In these instances, hard abrasive particles must be used to provide a satisfactory cutting operation, diamond particles being preferred. Past practices employed such particles in a slurry cooperating with a flat disc but in this arrangement, the cutting action is slow because the diamond particles are not anchored and therefore fail to exert any appreciable force to facilitate the cutting action. Furthermore, scratching of the work piece cannot be controlled. Another disadvantage resides in the fact that the diamond abrasive, which is relatively expensive, is rapidly washed away. Attempts to provide a satisfactory grinding tool incorporating very hard particles with a surface sufficiently flat for the precision work involved, such flatness being measured by an optical flat and held to a flatness specification on the order of two light bands, have proven unsuccessful.

In accordance with the present invention, a method is provided to form a grinding tool having an abrasive surface flat to a very high degree to cut work pieces with the precision required in the quartz glass lapping field, for example. This method comprises providing a cylindrical layer of bonded abrasive particles on a flat surface supported by a master form. This form may then be axially spaced from a holder by a precision sleeve, a preferably irregular surface on the holder being positioned parallel to the cylindrical layer of bonded abrasive particles.

In order to join the holder to the layer of abrasive particles, an alloy having a low temperature coefficient of thermal expansion and a low melting point may be flowed into the precision sleeve and when it hardens, the master mold and holder will be joined. The master mold may then be stripped from the layer of abrasive particles, this operation being facilitated if a layer of lubricating agent is interposed between the abrasive particles and the master mold, and the layer of particles etched to better expose the abrasive particles. In this manner, a highly precision grinding tool with a cutting surface flat to a specification to two light bands or better may be produced.

These and further advantages of the present invention will be more readily understood when the following description is read in connection with the accompanying drawings in which:

Figure 1 is a perspective view of a master mold having abrasive particles deposited on a flat end portion;

Figure 2 is a transverse section, greatly enlarged, of the master mold shown in Figure 1 illustrating the abrasive particles deposited thereon;

Figure 3 is a section of the master mold similar to that shown in Figure 2 but subsequent to the deposition of bonding material on the abrasive particles;

Figure 4 is a view in perspective, partially broken away, illustrating the manner in which a precision sleeve is used to join the master mold shown in Figure 1 to a holder;

Figure 5 is a view in perspective of the holder carrying the layer of abrasive particles after the master mold has been removed therefrom;

Figure 6 is a transverse section, greatly enlarged, of the holder illustrated in Figure 5; and Figure 7 is a transverse section similar to Figure 6 illustrating the abrasive surface after etching.

Referring in greater detail to an illustrative embodiment of the invention with particular reference to the drawings, a master mold 10 is formed of a cylindrical body 11 coaxially mounting a smaller diameter cylindrical front piece 12 provided with an extremely flat surface 13. For example, the surface is preferably held flat to a specification of two light bands when measured by means of an optical flat. As shown in Figure 2, a layer of a conventional conductive solid lubricant 14, enlarged for clarity, may be placed on the optically flat surface 13, abrasive particles 15 being electrophoretically deposited on the layer 14. The conductive solid lubricant layer 14 may comprise graphite, for example. Of course, it will be understood that the layer 14 is of uniform thickness in order to obtain the benefits of the optically flat surface 13. The size of the particles 15 has been greatly exaggerated in the drawings for the sake of clarity. It will be understood that such abrasive particles may be extremely small having diameters, for example, on the order of 5 to 10 microns.

As discussed in copending application Serial No. 388,-119, filed October 26, 1953, by Frederick Fahnoe and James J. Shyne, and now Patent No. 2,858,256, electrophoretic deposition occurs when an electrostatic field is established between two electrodes immersed within a colloidal or gross dispersion of charged particles, thus causing the migration of the particles comprising the suspended phase toward one of the electrodes and producing the deposit of an adherent coating on that electrode. Exceptional uniformity of coating thickness and compacting (with an attendant relatively high coating density) are obtained, as compared with dipping, spraying, brushing, and other more conventional methods of application.

The deposition itself can be precisely controlled through close control of the main parameters of the electrophoretic process; i.e., the voltage applied between the electrodes, the relative spacing of the electrodes, the duration of the process and the dispersion concentration. Although this precise control can only be obtained within certain parameter ranges described in more detail in copending application Serial No. 386,882, filed October 19, 1953, by Frederick Fahnoe and James J. Shyne, in general the rate of deposition increases both with increased voltage and increased dispersion concentration and decreases with increased electrode spacing. Moreover, the amount of deposition increases as the period of deposition is increased.

The liquid phase which is the carrier for the charged particles in the electrophoretic deposition must be a relatively anhydrous, non-conductive fluid. By a relatively non-conductive fluid we mean a fluid having a conductivity falling within the range of $10^{-5}$ to $10^{-9}$ ohm-cm., and preferably falling within the range of $10^{-6}$ to $10^{-8}$ ohm-cm. Examples of this type of fluid are: alcohols such as methyl, ethyl and isopropyl alcohols; ketones such as acetone; esters such as ethyl acetate; and aromatics such as nitrobenzene.

The coating formed by the deposition can be composed of any abrasive particles capable of being colloidally dispersed. For example, any natural abrasives such as diamond particles, silicon carbide, emery, garnet and the like, or any manufactured abrasives such as carbides, fused alumina particles and various metallic compounds, or mixtures of these abrasives can be so dispersed. The colloidal dispersion need not be stable as long as the charged particles can be retained in dispersion through forced agitation or by the use of peptizing agents; such particles may have diameters falling within the range 1/100 to 100 microns.

Subsequent to the deposition of the porous layer of abrasive particles 15 on the layer 14, a layer of metal 16 is preferably electrolytically deposited on the conductive layer 14 through the interstices between the particles 15, such deposition continuing until the metal 16 covers the particles 15 as shown in Figure 3. This process effectively bonds the abrasive particles 15 together to form a bonded layer 17 that may readily be removed from the mold 10 due to the lubricant layer 14.

More particularly, when electrolytic deposition is employed, the bonding material 16 must be a metal or alloy which is capable of being electrolytically deposited; for example, chromium, nickel, silver, copper or cobalt. In this situation, the bond is formed through mechanical meshing of the bonding and base materials at their common surface.

When "electroless" deposition is employed, the bonding material must be chosen from a small class of metallic compounds which are capable of being reduced to metal on the surface of the base material in the presence of a catalyst and without the application of heat; examples of this class are cobalt and nickel.

The deposition of the removable layer of bonded abrasive particles on the conductive layer 14 may be in accordance with the principles disclosed in copending application Serial No. 386,882, filed October 19, 1953, by Frederick Fahnoe and James J. Shyne, and now Patent No. 2,848,391.

Referring next to Figure 4, the master mold 10 carrying the layer of bonded abrasive particles 17 coaxially fits into one end of a precision formed preferably cylindrical sleeve 18, the outer diameter of the cylindrical piece 12 matching the inner diameter of the sleeve 18. Preferably, the interior surface of the sleeve 18 carries a layer 19 of a conventional release or lubricating agent such as a silicon containing oil. Extending longitudinally from the other end of the sleeve 18 is a port 20 adapted to receive a flow of molten metal.

Positioned in the other end of the precision sleeve 18 is a holder 21, best shown in Figure 5, formed of a cylindrical body piece 22 and a cylindrical joining piece 23 mounted coaxially therewith. Preferably, an outer flat surface 24 of the piece 23 is provided with suitable irregularities formed by knurling, serrating, scoring, or like processes. The outer diameter of the joining piece 23 preferably matches the inner diameter of the sleeve 18 to permit a close fit therebetween, as shown in Figure 4.

With the master mold 10 and the holder 21 mounted in the sleeve 18 as shown in Figure 4, an alloy 25 having a low temperature coefficient of thermal expansion is poured through the port 20 into the sleeve 18 to fill the space between the layer 17 and surface 24 which are maintained in a parallel relation. The alloy 25 must, of course, have the property of securely adhering to the metal from which the holder 21 is formed and the metal employed as the bonding agent 16. In addition, the alloy 25 should have a fairly low melting point in order to preclude the warpage of any of the elements involved in the process by exposure to excessive heat. For example, the alloy commercially designated "Cerrotru," consisting of 58% bismuth, 42% tin and having a melting point of about 138° C. and a low coefficient of thermal expansion. Another similar alloy is Cerromatrix, which contains 14.5% tin, 48% bismuth, 28.5% lead and 9% antimony, with a melting point of about 105° C.

After the sleeve 18 has been filled with the alloy 25, it is allowed to cool and harden or it may be artificially cooled in any desired manner. When the alloy 25 has firmly set, the master mold is stripped from the bonded adhesive particle layer 17, this operation being facilitated by the solid conductive lubricant 14. Subsequently, the holder 21, which with the attached cylinder of hardened alloy 25 and bonded layer 17 forms a grinding tool, is removed from the sleeve 18. The irregular surface 24 aids in securely bonding the alloy 25 to the holder 21. The removal of the grinding tool from the sleeve 18 does not present any difficulties due to the use of the lubricating layer 19. Also, since the port 20 extends from the end of the sleeve 18, any of the alloy 25 protruding therethrough will not interfere with the removal of the grinding tool.

In Figures 5 and 6 the grinding tool is illustrated immediately after its removal from the sleeve 18. In certain instances, it may be used as shown when, for example, the bonding metal 16 is fairly soft and normal grinding use will wear it away from the particles 15. However, in many instances it is desirable to etch the layer 17 in order to better expose the abrasive particles 15. For example, the layer 17 may be electrolytically etched to provide the configuration shown in Figure 7 in which the abrasive particles 15 extend somewhat above the bonding metal 16. At this time, the grinding tool is readied for insertion into a suitable chuck for use in precision lapping of various articles.

A grinding tool formed in accordance with the methods described above has an abrasive surface defined by the particles 15 which has an optically flat surface, i.e., a surface flat when measured optically which is substantially as flat as the optically flat surface 13 upon which it is formed. Furthermore, the use of the precision sleeve 18 accurately positions the cutting surface of the grinding tool parallel to the holder 21. Such a grinding tool permits extremely high precision work and since the abrasive particles 15 are securely anchored, scratching is highly controlled and the cutting speed is impressively increased.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. A method of forming a grinding tool comprising the steps of providing a removable cylindrical layer of bonded abrasive particles on an extremely flat surface supported by a master element, axially spacing a circular surface on a holding member from the cylindrical layer on the master element with the surface and the layer facing each other, flowing a molten alloy into the space between the master element and member to join the cylindrical layer of bonded abrasive particles to the holding member when the molten metal hardens, and removing the master element from the cylindrical layer of bonded material.

2. A method as defined in claim 1 which comprises the additional step of etching the cylindrical layer of bonded abrasive particles after removal of the master element to better expose an abrasive surface.

3. A method of forming a grinding tool comprising the steps of providing a removable cylindrical layer of bonded abrasive particles on an optically flat surface supported by a master element, positioning a hollow open ended figure of revolution to axially space a circular surface on a holding member from the cylindrical layer on the master element with the surface and the layer facing each other, filling the figure of revolution with a molten alloy to join the cylindrical layer of bonded abrasive particles to the holding member when the molten alloy hardens, removing the master element from the cylindrical layer of bonded material, and removing the holding member from the figure of revolution.

4. A method as defined in claim 3 which comprises the additional step of etching the cylindrical layer of bonded abrasive particles after removal of the master element to better expose an abrasive surface.

5. A method of forming a grinding tool comprising the steps of providing a removable cylindrical layer of bonded abrasive particles on an optically flat surface supported by a master element, coaxially positioning a cylindrical sleeve having an inner diameter equal to the outer diameter of the cylindrical layer of bonded abrasive particles in overlapping relation with the cylindrical layer, coaxially positioning a cylindrical portion of a holding member in the other end of the sleeve with its surface facing the layer of bonded abrasive particles, filling the sleeve with a molten alloy having a low melting point and a low temperature coefficient of thermal expansion to join the cylindrical layer and the holding member when the molten alloy hardens, removing the master element from the cylindrical layer of bonded material, and removing the holding member from the sleeve.

6. A method as defined in claim 5 which comprises the additional step of etching the cylindrical layer of bonded abrasive particles after removal of the master element to better expose an abrasive surface.

7. A method as defined in claim 5 in which the the interior surface of the sleeve is coated with a lubricating release agent prior to the steps of mounting the master element and the holding member therein.

8. A method as defined in claim 5 in which the cylindrical layer of bonded abrasive particles is formed by electrophoretically depositing abrasive particles on an optically flat surface, and electrolytically depositing metal on the flat surface between the particles to bond them together.

9. A method as defined in claim 5 in which irregularities are formed on the surface of the holding member prior to positioning it in the sleeve.

References Cited in the file of this patent

UNITED STATES PATENTS

| | | |
|---|---|---|
| 704,399 | Taluau | July 8, 1902 |
| 1,151,317 | Wood | Aug. 24, 1915 |
| 2,367,286 | Keeleric | Jan. 16, 1945 |
| 2,388,020 | Suwa | Oct. 30, 1945 |
| 2,423,293 | Ciell | July 1, 1947 |
| 2,467,596 | Pratt | Apr. 19, 1949 |
| 2,496,352 | Metzger et al. | Feb. 7, 1950 |
| 2,728,124 | Sofield | Dec. 27, 1955 |

UNITED STATES PATENT OFFICE

CERTIFICATE OF CORRECTION

Patent No. 2,904,418 September 15, 1959

Frederick Fahnoe

It is hereby certified that error appears in the above numbered patent requiring correction and that the said Letters Patent should read as corrected below.

In the grant, lines 2 and 12, and in the heading to the printed specification, lines 3 and 4, name of assignee, for "Vibro Corporation of America" read -- Vitro Corporation of America --.

Signed and sealed this 19th day of April 1960.

(SEAL)
Attest:

KARL H. AXLINE
Attesting Officer

ROBERT C. WATSON
Commissioner of Patents